(12) United States Patent
Shikano

(10) Patent No.: US 7,101,054 B2
(45) Date of Patent: Sep. 5, 2006

(54) LIGHT EMITTING APPARATUS

(75) Inventor: Toshiya Shikano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 10/770,110

(22) Filed: Feb. 2, 2004

(65) Prior Publication Data

US 2004/0174594 A1    Sep. 9, 2004

(30) Foreign Application Priority Data

Feb. 3, 2003   (JP) ............................. 2003-025660
Feb. 3, 2003   (JP) ............................. 2003-025673

(51) Int. Cl.
*F21V 9/14*    (2006.01)
(52) U.S. Cl. .......................................... 362/19; 359/485
(58) Field of Classification Search .................. 362/19, 362/508–522, 297, 346; 359/485, 494, 495, 359/498, 580, 584, 586, 589
See application file for complete search history.

(56) References Cited

U.S. PATENT DOCUMENTS

| | | | |
|---|---|---|---|
| 2,748,659 A | * | 6/1956 | Geffcken et al. ........... 359/487 |
| 2,982,178 A | | 5/1961 | Marks |
| 3,458,248 A | * | 7/1969 | Eversole ..................... 359/488 |
| 3,743,380 A | * | 7/1973 | Fugitt ......................... 359/487 |
| 3,876,285 A | * | 4/1975 | Schwarzmuller ............ 359/487 |
| 5,662,400 A | | 9/1997 | Shikama et al. |
| 5,764,412 A | * | 6/1998 | Suzuki et al. ............... 359/487 |

FOREIGN PATENT DOCUMENTS

| | | |
|---|---|---|
| GB | 880 374 | 11/1961 |
| JP | 61-253236 | 11/1986 |
| JP | 9-293406 | 11/1997 |

* cited by examiner

*Primary Examiner*—Renee Luebke
*Assistant Examiner*—Gunyoung T. Lee
(74) *Attorney, Agent, or Firm*—Hamre, Schumann, Mueller & Larson, P.C.

(57) ABSTRACT

First and second polarized light beam splitters 13, 14 split non-polarized light L into p polarized light P and s polarized light S1 and allow the p polarized light P to transmit in the same direction as that of the non-polarized light L, reflecting the s polarized light S1. A light emitting apparatus 1 emits one the s polarized light and the p polarized light that are split by the first and second polarized light beam splitters 13, 14 as first vertical polarized light having a vibration plane in an electric field substantially perpendicular to the ground and converts the other of the p polarized light and the s polarized light by first and second ½ wave plates 5, 6 for converting a vibration plane in an electric field as second vertical polarized light having a vibration plane in an electric field substantially perpendicular to the ground for emission.

1 Claim, 13 Drawing Sheets

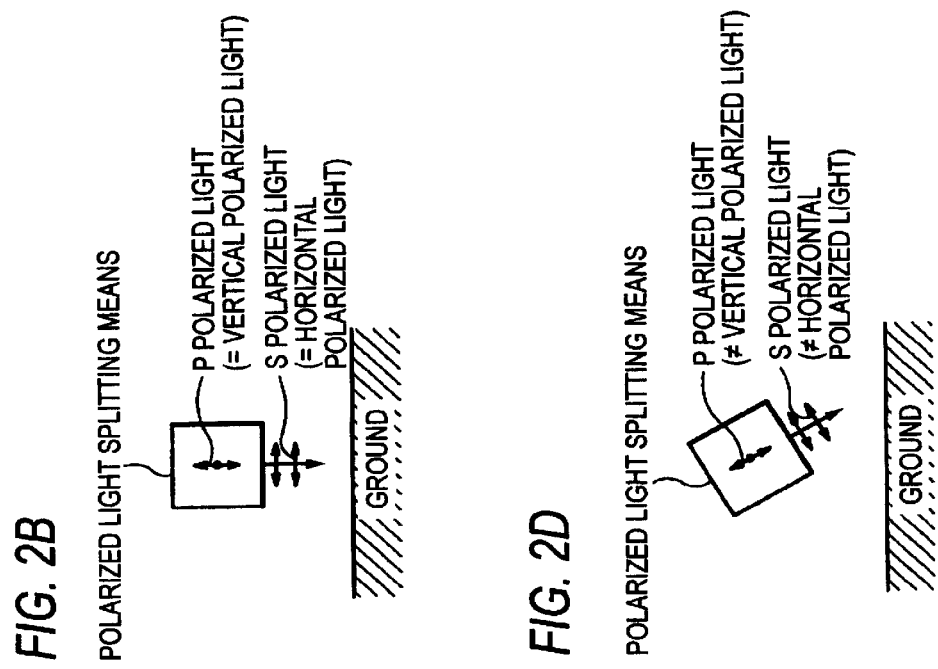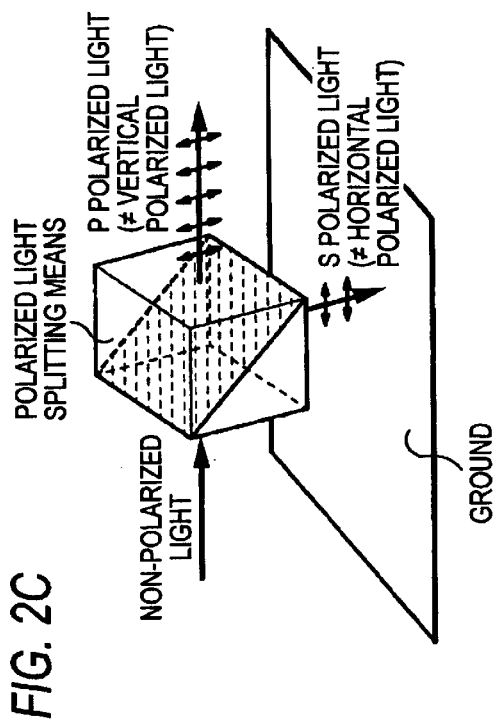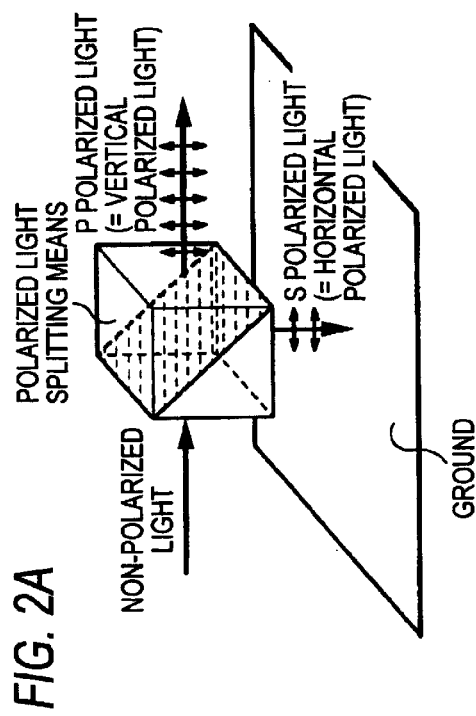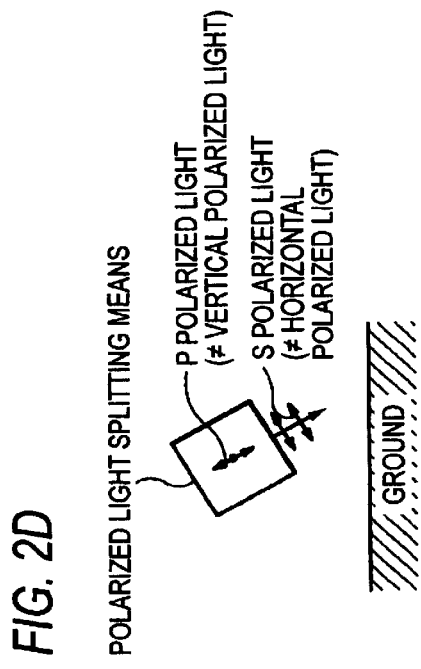
FIG. 2A
FIG. 2B
FIG. 2C
FIG. 2D

LIGHT EMITTING APPARATUS

BACKGROUND OF THE INVENTION

The present invention relates to a light emitting apparatus such as headlamps and fog lamps which are equipped on an automotive vehicle.

Further, the present invention relates to a polarized light splitting device and an automotive light emitting apparatus, and more particularly to a polarized light splitting device for splitting non-polarized light emitted from a light source into p polarized light and s polarized light and an automotive light emitting apparatus having the polarized light splitting device.

Headlamps and fog lamps equipped on a vehicle are such as to be illuminated when there occurs a situation where conditions ahead of the vehicle become difficult to be identified. For example, the headlamps are used at night or in a tunnel where surrounding conditions are invisible due to darkness, or when the vision in front gets worse due to heavy rain or thick fog.

Incidentally, in the event that the headlamps of the vehicle are illuminated at the time of thick fog or heavy rain, light emitted from the headlamps are reflected irregularly by rain drops or particles of fog, there occurs a situation where a wall of light, as it were, appears in front of the vehicle, and the vision in front is interrupted.

FIG. 14 shows a condition of light emitted from the headlamps of the vehicle at the time of thick fog or heavy rain, in which FIG. 14A is an exemplary diagram illustrating a distribution of light from the headlamps in such a condition, and FIG. 14B is an exemplary diagram illustrating an irregular reflection produced on the surfaces of rain drops at the time of heavy rain.

As shown in FIG. 14A, since light emitted from the headlamps is irregularly reflected in a complex fashion on the surfaces of fine particles of vapor or rain drops which exist on the optical paths and forms a wall of light in the vicinity of the vehicle, the driver cannot secure the vision in far front of the vehicle.

As shown in FIG. 14B, light is reflected repeatedly and in various direction on the surfaces of rain drops, and the driver feels that there appears a wall of light due to rain drops illuminated by the headlamps. In a condition like this, an object which can be identified in a normal condition cannot be identified.

Here, while rain drops falling at the time of thick fog or heavy rain are formed into a substantially spherical shape, as the particle shape becomes larger, rain drops are subjected to larger air resistance and becomes flat, whereby the surface area of such rain drops is increased. Since rain drops are fanned into such a shape, light from the headlamps which enters sideways is irregularly reflected in various ways and is then diffused in a vertical direction relative, in particular, to the ground. Furthermore, since the density of rain drops is increased at the time of thick fog or heavy rain, light irregularly reflected once by rain drops is reflected again by lots of rain drops existing in the vicinity of the original rain drops, and thus, the reflection is repeated, whereby rain drops in the whole area illuminated by light emitted from the headlamps are illuminated, so that the driver feels as if there appears a wall of light in the vicinity of the vehicle, and the vision in front of the driver is interrupted, the vision in far front of the vehicle thereby becoming difficult to be identified by the driver.

Incidentally, there exists an invention for interrupting light from headlamps by incorporating polarizer in headlamps of a vehicle (for example, refer to JP-A-61-253236 (page 2, FIGS. 1 to 3)). This invention is intended to prevent the dazzle of the driver by the headlamps in high-beam conditions, and a polarizer is incorporated in a high-beam lamp of the headlamp and a light detector is incorporated in a windscreen, so that the driver is prevented from being dazzled by high beams from an oncoming vehicle.

JP-A-61-253236 (page 2, FIGS. 1 to 3)

Further, conventionally, there are disclosed polarized light splitting devices for improving the utilization rate of light emitted from a light source by laminating alternately high refractive index films and low refractive index films (for example, refer to JP-A-9-293406 (pages 4 to 5, FIG. 1 and FIGS. 8 to 12)).

A polarized light splitting device described in JP A-9-293406 (pages 4 to 5, FIG. 1 and FIGS. 8 to 12) is a polarizing plane light source device in an image display using linear or plane polarization such as a general purpose liquid crystal display.

Here, the polarized light splitting device is such that a polarized light splitting layer is formed by two to six transparent films comprising glass as a high refractive index film, a polyester film and a polyphenol A polycarbonate film.

In addition, a light emitting apparatus fitted on an automotive vehicle such as a headlamp and a fog lamp is such as to illuminate when there occurs a situation where a condition in front of the vehicle becomes difficult to be identified by the naked eyes of the driver.

Then, in order to improve the vision in front of the vehicle by eliminating the problem, it is conceivable to adopt the polarized light splitting device described in JP A-9-293406 (pages 4 to 5, FIG. 1 and FIGS. 8 to 12) for the automotive light emitting apparatus.

Namely, it can be contemplated to improve the utilization rate of light emitted from the light source so as to brightly illuminate the front of the vehicle.

However, in the invention described in JP-A-61-253236 (page 2, FIGS. 1 to 3), since light emitted from the headlamp is cut due to the utilization of the polarizer (a polarizing filter), 50% or more of the light so emitted is lost and this reduces the utilization efficiency of headlamp light, causing a problem that the illuminated area gets dark.

Due to this, in the event that such headlamps are used at the time of thick fog or heavy rain, the illuminated area in front of the vehicle gets darker.

Namely, with the headlamps according to JP-A-61-253236 (page 2, FIGS. 1 to 3), it is not possible to illuminate brightly the area in front of the vehicle, and since the invention is not intended to cope with a case where the vision of the driver is interrupted by thick fog or heavy rain, the invention can provide no effect to improve the vision at the time of thick fog or heavy rain.

In addition, since the polarizer (the polarizing filter) has in general a low heat resistance, in the event that it is used in the headlamp, there is caused a problem that the polarizing performance of the polarizer heated by the heat of the headlamp is deteriorated drastically.

Furthermore, in a case where the light emitting apparatus is used as an automotive headlamp, due to the configuration of a location of a vehicle where the headlamp is disposed or the construction of the light emitting apparatus, there have exsisted limitations not only on the disposition of the headlamp but also on the design of vehicles.

Further, in a case, however, where the polarized light splitting device in JP A-9-293406 (pages 4 to 5, FIG. 1 and FIGS. 8 to 12) above where the high refractive index films and the low refractive index films which comprise the solids such as transparent films are laminated is used for an object which is subjected to vibration during traveling such as a vehicle, there is expected a deformation or deviation between the high refractive index film and the low refractive index film.

Consequently, since the refractive indices and the direction of reflection are changed due to such a deviation between the laminated films in the laminated layer, there is caused a problem that proper refraction and reflection of light cannot be attained, and hence, splitting into appropriate polarized light cannot be attained.

It is desired that the polarized light splitting device and the automotive light emitting apparatus equipped with the polarized light splitting device need to be maintained in a condition where enough durability to eliminate the occurrence of any deformation or deviation in position that would be caused between the high refractive index film and the low refractive index film in the polarized light splitting device by vibrations, so that proper refraction and reflection of light and splitting into appropriate polarized light can be attained at all times.

SUMMARY OF THE INVENTION

An object of the invention is to provide a light emitting apparatus which can provide a light utilization efficiency which is so high that the vision can be improved even if the vision is interrupted by fog or the like and which is so compact in size that no limitation on design is imposed.

Further, an object of the invention is to provide a polarized light splitting device and an automotive light emitting apparatus having the polarized light splitting device in which there occurs no deformation between a high refractive index film and a low refractive index film due to vibrations, so that an appropriate light splitting can be attained at all times.

With the view to attaining the object, according to a first aspect of the invention, there is provided a light emitting apparatus comprising a light source for emitting non-polarized light, a parabolic mirror for making non-polarized light emitted from the light-source into parallel light beams, first and second polarized light splitting section divided to be arranged around the periphery of the light source for splitting the non-polarized light from the parabolic mirror into p polarized light and s polarized light, transmitting the p polarized light in the same direction as the direction of incidence of the non-polarized light and reflecting the s polarized light, and a reflecting section disposed on outer circumferential portions of the first and second polarized light splitting section for reflecting the s polarized light reflected by the first and second polarized light splitting section in the same direction as the p polarized light, wherein one of the s polarized light and the p polarized light which are split by the first and second polarized light splitting section is emitted as first vertical polarized light having a vibration plane in an electric field which is substantially normal to the ground, and the other of the p polarized light and the s polarized light is converted as second vertical polarized light having a vibration plane in an electric field which is substantially normal to the ground by a conversion section for converting a vibration plane in an electric field for emission.

According to the first aspect of the invention, the polarized light splitting section is divided to be disposed around the periphery of the light source, and the s polarized light which is reflected by each polarized light splitting section is aligned in the same emitting direction as that of the p polarized light which is allowed to transmit each polarized light splitting section, so that both the p polarized light and the s polarized light can be emitted as vertical polarized light so as to illuminate ahead of the vehicle. Due to this, all the non-polarized light emitted from the light source is converted to the vertical polarized light so as to attempt an effective use of the light to thereby suppress the reflection in the vertical direction, whereby an area ahead of the vehicle can be illuminated clearly, thereby making it possible to secure the vision in front of the vehicle. In addition, the light emitting apparatus can be made compact by dividing the polarized light splitting section to be disposed around the periphery of the light source.

According to a second aspect of the invention, there is provided a light emitting apparatus as set forth in the first aspect of the invention, wherein the polarized light splitting section has the first and second polarized light splitting section which are divided in a substantially horizontal direction to be disposed so that an incidence plane of non-polarized light emitted from the light source is formed in such a manner as to extend horizontally, whereby p polarized light split by the first and second polarized light splitting section is transmitted in the same direction as the non-polarized light and is thereafter converted to second vertical polarized light by the converting section, and s polarized light split by the first and second polarized light splitting section is emitted as first vertical polarized light which is reflected substantially horizontally and is thereafter emitted in the same direction as the p polarized light by the reflecting section.

According to the second aspect of the invention, the first and second polarized light splitting section are divided in the substantially horizontal direction to be disposed so that an incidence plane of non-polarized light emitted from the light source is formed in such a manner as to extend horizontally, whereby the s polarized light that is split and reflected by the first and second polarized light splitting section has a vibration plane in an electric field which is substantially normal to the ground, the light being able to be used as first vertical polarized light as it is. Due to this, when compared with the s polarized light emitted via the reflecting section, by converting the vibration plane of the p polarized light directly reflected from the first and second polarized light splitting section by the converting section, the construction becomes simple in which the converting section is provided, thereby making it possible to make the light emitting apparatus compact further.

Further, with a view to solving the problem, according to a third aspect of the invention, there is provided a polarized light splitting device for splitting non-polarized light emitted from a light source into p polarized light whose vibrating direction in an electric field is horizontal relative to a plane of incidence and s polarized light whose vibrating direction in the electric field is vertical relative to the plane of incidence by laminating alternately high refractive index films and low refractive index films so that the non-polarized light emitted from the light source is allowed to transmit and is reflected, wherein the low refractive index films comprise a gaseous layer, and a spacer is partially interposed between the respective high refractive index films.

According to the third aspect of the invention, since, even in the event that vibrations act on the polarized light splitting device, the relative deviation between the respective high refractive index films is permitted by the gaseous layer which is the low refractive index film at other positions where the spacer is provided by providing the spacer, the performance of the polarized light splitting device can be secured for a long period of time. In addition, since a certain space is ensured between the high refractive index film and the low refractive index film by the spacer, a deformation or deviation in position between the high refractive index film and the low refractive index film can be prevented.

According to a forth aspect of the invention, there is provided an automotive light emitting apparatus having a polarized light splitting device for splitting non-polarized light emitted from a light source into p polarized light whose vibrating direction in an electric field is horizontal relative to a plane of incidence and s polarized light whose vibrating direction in the electric field is vertical relative to the plane of incidence by laminating alternately high refractive index films and low refractive index films so that the non-polarized light emitted from the light source is allowed to transmit and is reflected, wherein the low refractive index films comprise a gaseous layer, and a spacer is partially interposed between the respective high refractive index films.

According to the forth aspect of the invention, a constant space can be maintained between the respective high refractive index films by the spacer. Due to this, even if the vehicle is subjected to vibrations or impacts while running, the spacer can maintain the distance between and shape of the respective high refractive index films, so that proper polarized light splitting can be implemented at all times, thereby making it possible to provide an optimal polarized light splitting device for an automotive light emitting apparatus. In addition, the production costs can be reduced by the formation of the low refractive index film of the gaseous layer. With the spacer being partially interposed between the respective high refractive index films, the prevention of interruption of passage of the p polarized light and the s polarized light through the high refractive index films, thereby making it possible to improve the utilization rate of light.

According to a fifth aspect of the invention, there are provided a polarized light splitting device and an automotive light emitting apparatus as set forth in the third or forth aspect of the invention, wherein the spacer is partially interspersed between the respective high refractive index films.

According to the fifth aspect of the invention, by interspersing the spacer between the respective high refractive index films, not only can the function of the space be obtained through a simple construction but also the prevention of the passage of the p polarized light and the s polarized light between the respective high refractive index films can be suppressed to a minimum level. In addition, since the spacer can easily be placed between the respective high refractive index films, the productivity can be improved.

According to a sixth aspect of the invention, there are provided a polarized light splitting device and an automotive light emitting apparatus as set forth in the third or forth aspect of the invention, wherein the spacer is formed into a grid- or mesh-like structure.

According to the sixth aspect of the invention, the spacer that is simple in construction and sturdy can be obtained by forming the spacer into the grid-like or mesh-like structure. In addition, since the space can be placed in such a manner as to be held between the respective high refractive index films, a polarized light splitting device having a desired polarized light splitting function can easily be obtained, thereby making it possible to improve the productivity.

In the polarized light splitting device and the automotive light emitting apparatus according to the invention, it is preferred that a material for the space includes a heat-resistant resin.

According to this construction, since the deformation of the spacer caused by heat from the light source or rays of solar light can be prevented, an appropriate splitting of polarized light can be implemented at all times. In addition, since the space is formed from the resin, the production thereof can be facilitated.

In the polarized light splitting device and the automotive light emitting apparatus according to the invention, it is preferred that the spacer is formed integrally with the high refractive index films.

According to the construction, since the spacer and the respective high refractive index films can be formed integrally at one time, the numbers of components and man-hours for assembling can be decreased, whereby the production costs can be reduced.

BRIEF DESCRIPTION OF THE DRAWINGS

FIGS. 2A to 2D are diagrams for explaining the difference between s polarized light and p polarized light and horizontal polarized light and vertical polarized light, in which FIG. 2A is a schematic perspective view illustrating vibrating directions of p polarized light and s polarized light when a polarized light splitting section is placed in parallel relative to the ground FIG. 2B is a schematic side view illustrating the vibrating directions of the p polarized light and the s polarized light when the polarized light splitting section is placed in parallel relative to the ground FIG. 2C is a schematic perspective view illustrating the vibrating directions of the p polarized light and the s polarized light when the polarized light splitting section is placed in an inclined fashion relative to the ground, and FIG. 2D is a schematic side view illustrating the vibrating directions of the p polarized light and the s polarized light when the polarized light splitting section is placed in an inclined fashion relative to the ground.

FIGS. 7A and 7B are diagrams illustrating an example where the light emitting apparatus according to the first embodiment of the invention is applied to a headlamp of the vehicle, in which FIG. 7A is an exemplary diagram illustrating a distribution of light emitted from the light emitting apparatus at the time of thick fog or heavy rain, and FIG. 7B is an exemplary diagram illustrating a irregular reflection produced on the surfaces of rain drops when light is emitted from the light emitting apparatus.

A schematic cross-sectional view illustrating the light emitting apparatus according to the second embodiment of the invention.

Figure 12:
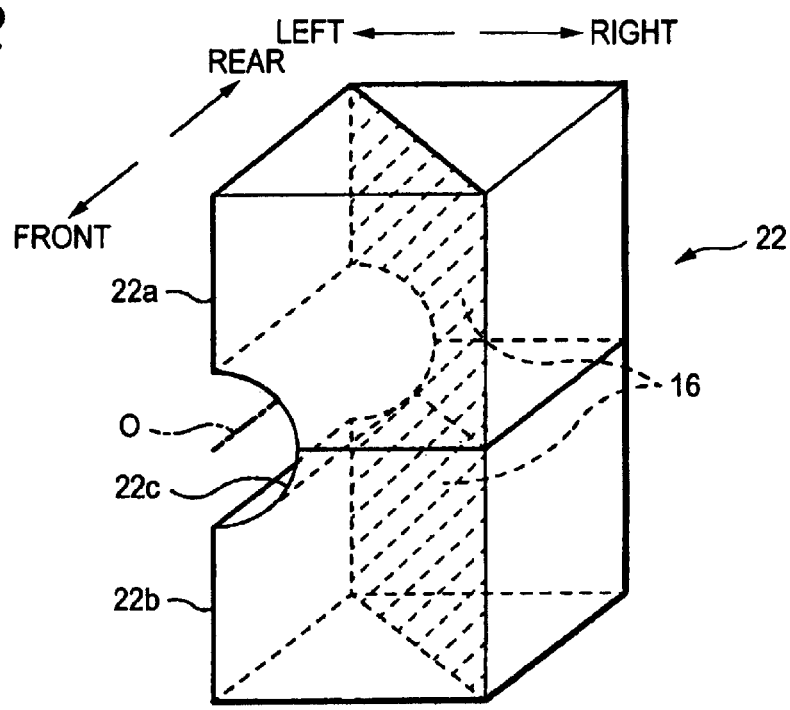

FIG. 12 is a diagram illustrating the light emitting apparatus according to the second embodiment of the invention, which is a schematic perspective view of a first polarized light beam splitter.

Figure 13:
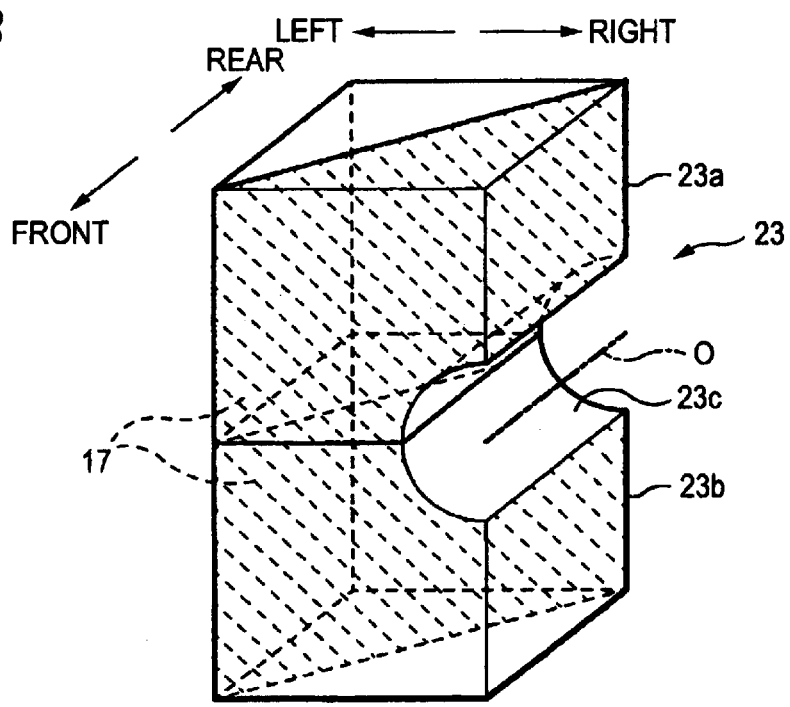

FIG. 13 is a diagram illustrating the light emitting apparatus according to the second embodiment of the invention, which is a schematic perspective view of a second polarized light beam splitter.

Figure 14A:
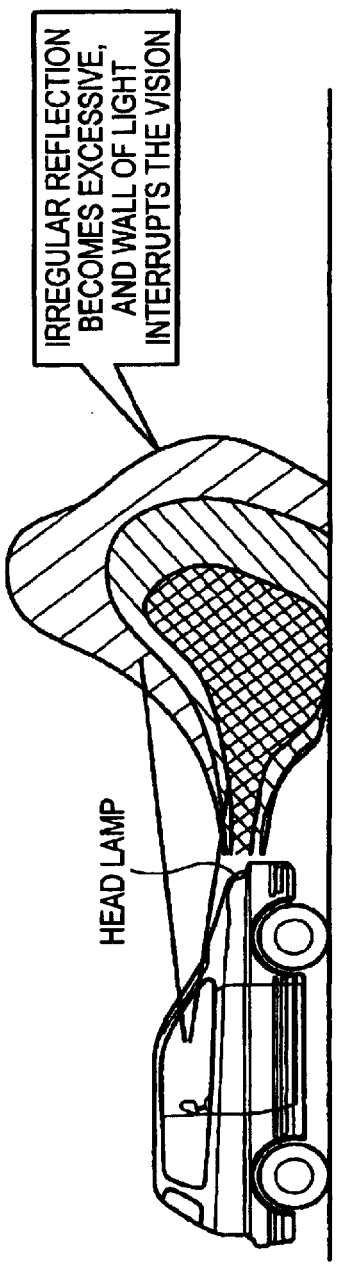
Figure 14B:
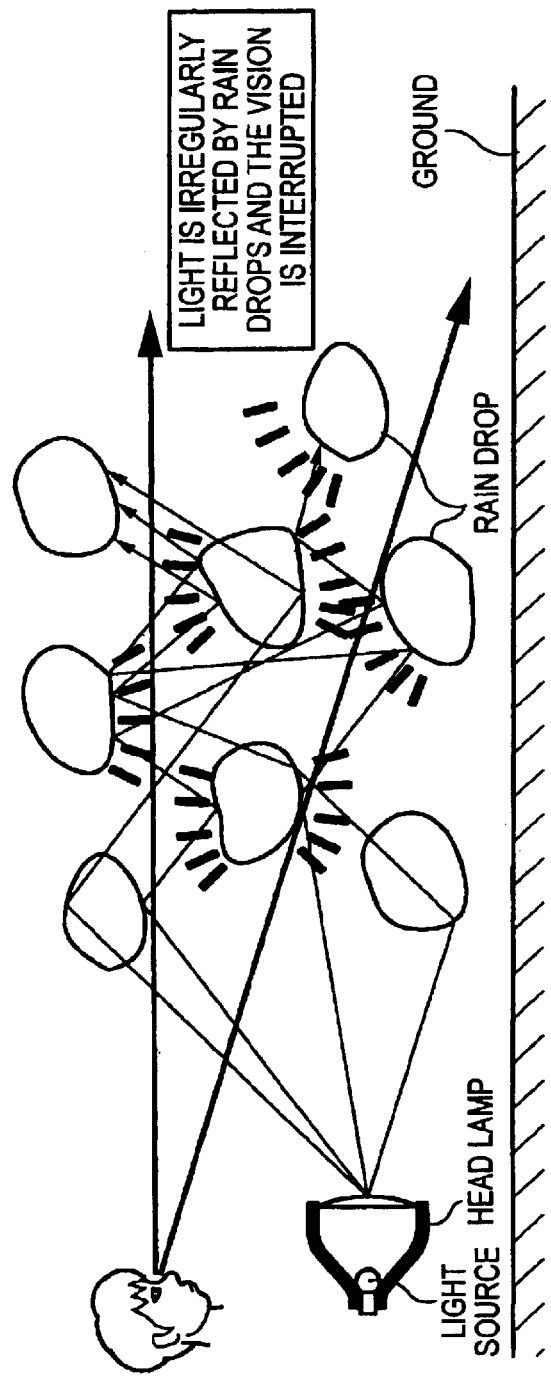

FIGS. 14A and 14B are diagrams illustrating conditions of light emitted from headlamps at the time of thick fog or heavy rain, in which FIG. 14A is an exemplary diagram illustrating a distribution of the light from the headlamps at such a time, and FIG. 14B is an exemplary diagram illustrating an irregular reflection produced on the surfaces of rain drops at the time of thick fog or heavy rain.

Figure 15:
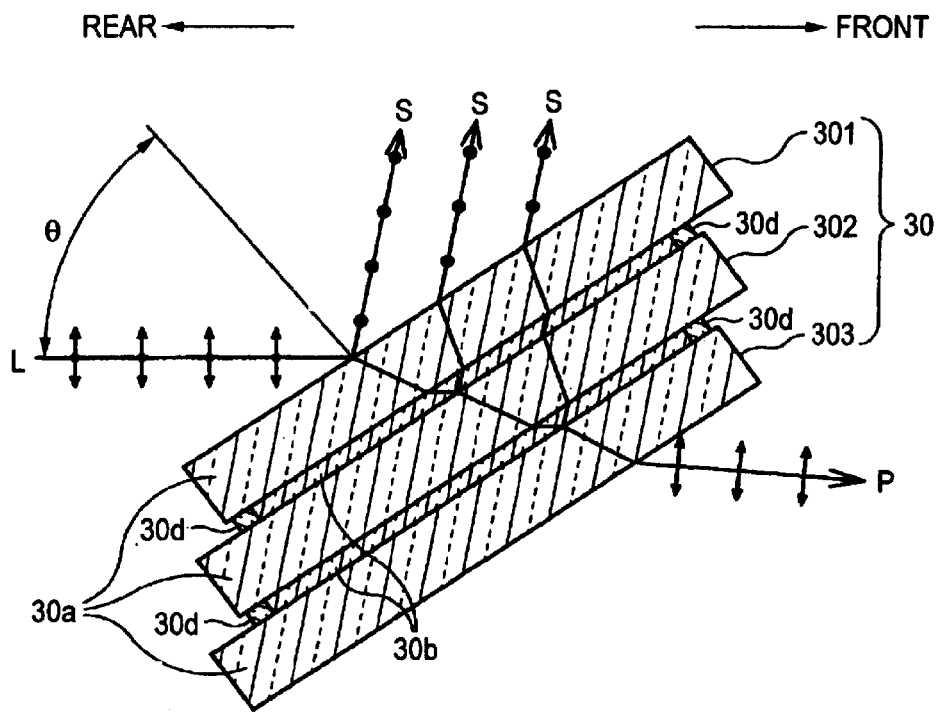

FIG. 15 is a diagram illustrating the polarized light splitting device and the automotive light emitting apparatus according to the embodiment of the invention, which is an exemplary diagram illustrating the construction of a first film-laminated layer placed on a first polarized light beam splitter.

Figure 16:
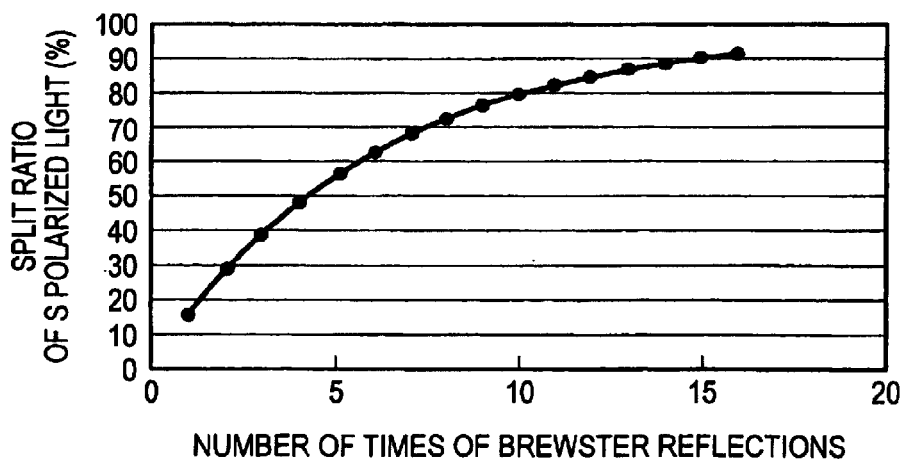

FIG. 16 is a graph of broken line illustrating a relationship between the number of times of Brewster reflections of the first and second polarized light beam splitters and a split ratio of s polarized light.

Figure 17:
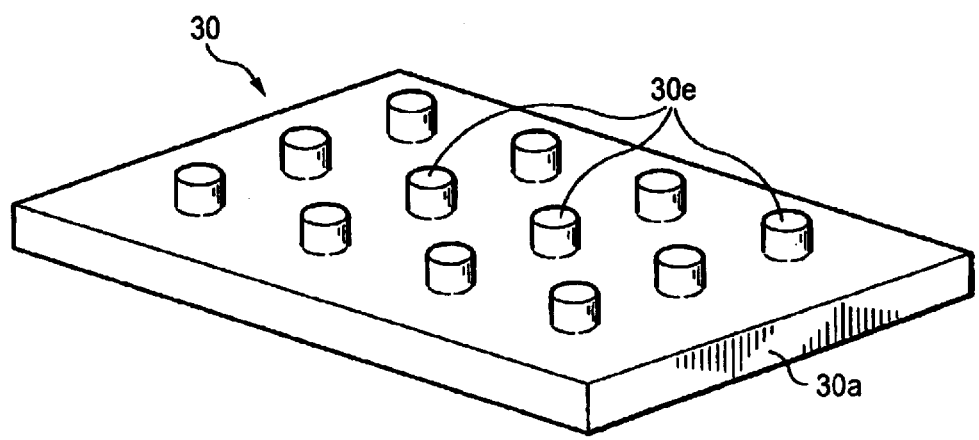

FIG. 17 is a diagram illustrating the polarized light splitting device and the automotive light emitting apparatus according to the embodiment of the invention, which is a perspective view illustrating a modification to a spacer.

Figure 18:
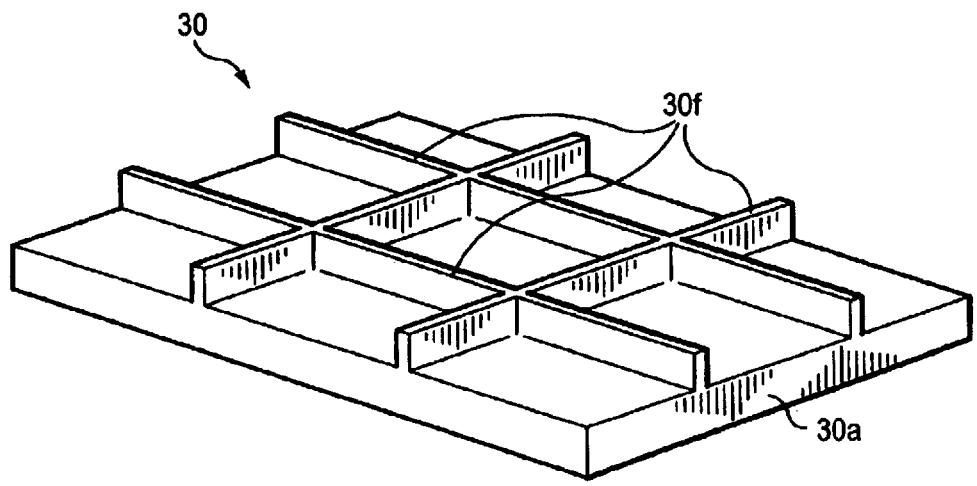

FIG. 18 is a diagram illustrating the polarized light splitting device and the automotive light emitting apparatus according to the embodiment of the invention, which is a perspective view illustrating another modification to the spacer.

DETAILED DESCRIPTION OF THE PREFERRED EMBODIMENTS

Referring to the accompanying drawings, embodiments of a light emitting apparatus according to the invention will be described in detail below. In the description of the embodiments of the invention, as a matter of convenience in description, initially, "p polarized light, s polarized light, horizontal polarized light and vertical polarized light" will be described in that order, and thereafter, a "first embodiment of a light emitting apparatus according to the invention", and a "second embodiment of a light emitting apparatus according to the invention" will be described in that order.

Note that in embodiments of the invention, "front", "rear", "up or upper" and "low or lower" denote front, rear, vertically up or upper and vertically low or lower of the vehicle, respectively. (p polarized light, s polarized light, horizontal polarized light and vertical polarized light)

Figure 1:
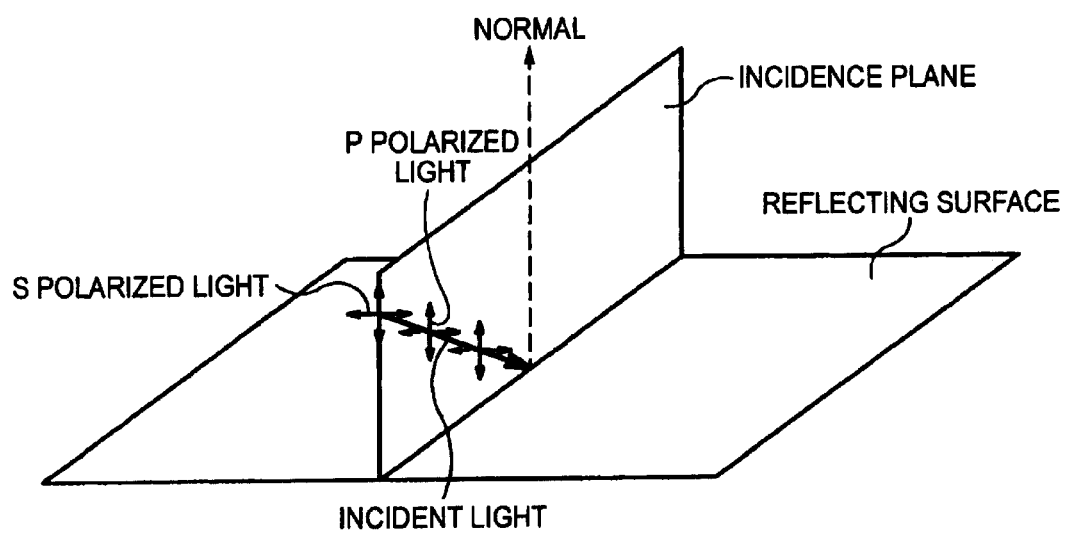
FIG. 1 is a schematic perspective view for explaining p polarized light and s polarized light.

Firstly, in the drawings, FIG. 1 is a schematic perspective view for explaining p polarized light and s polarized light. In addition, FIG. 2 explains the difference between s polarized light and p polarized light and horizontal polarized light and vertical polarized light, in which FIG. 2A is a schematic perspective view illustrating vibrating directions of p polarized light and s polarized light when a polarized light splitting section is placed in parallel relative to the ground, FIG. 2B is a schematic side view illustrating the vibrating directions of the p polarized light and the s polarized light when the polarized light splitting section is placed in parallel relative to the ground, FIG. 2C is a schematic perspective view illustrating the vibrating directions of the p polarized light and the s polarized light when the polarized light splitting section is placed in an inclined fashion relative to the ground, and FIG. 2D is a schematic side view illustrating the vibrating directions of the p polarized light and the s polarized light when the polarized light splitting section is placed in an inclined fashion relative to the ground.

As shown in FIG. 1, p polarized light is linear polarized light whose vibrating direction in an electric field is parallel to an incidence plane, and s polarized light is linear polarized light whose vibrating direction in an electric field is perpendicular to the incidence plane. Note that the incidence plane means a plane containing a normal of a reflecting surface where light is reflected and an optical axis of an incident light. Namely, the p polarized light and s polarized light are concepts regulated relative to the incidence plane.

On the other hand, horizontal polarized light and vertical polarized light are concepts regulated relative to the ground, and polarized light whose vibrating direction in an electric field is parallel to the ground is referred to horizontal polarized light and polarized light whose vibrating direction in an electric field is vertical to the ground is referred to as vertical polarized light. Consequently, as shown in FIGS. 2A, 2B, in a case where the incidence plane of the polarized light splitting section is disposed vertically relative to the ground, namely, in a case where the ground constitutes a reflection surface, p polarized light split by the polarized light splitting section coincides with vertical polarized light, and s polarized light coincides with horizontal polarized light.

In addition, as shown in FIGS. 2C, 2D, in a case where the incidence plane of the polarized light splitting section is not placed vertical relative to the ground, in other words, in a case where the ground does not constitute a reflection surface, p polarized light and s polarized light do not coincide with vertical polarized light and horizontal polarized light, respectively.

(First Embodiment)

Next, a light emitting apparatus according to a first embodiment of the invention will be described by reference to FIGS. 3 to 7.

Figure 3:
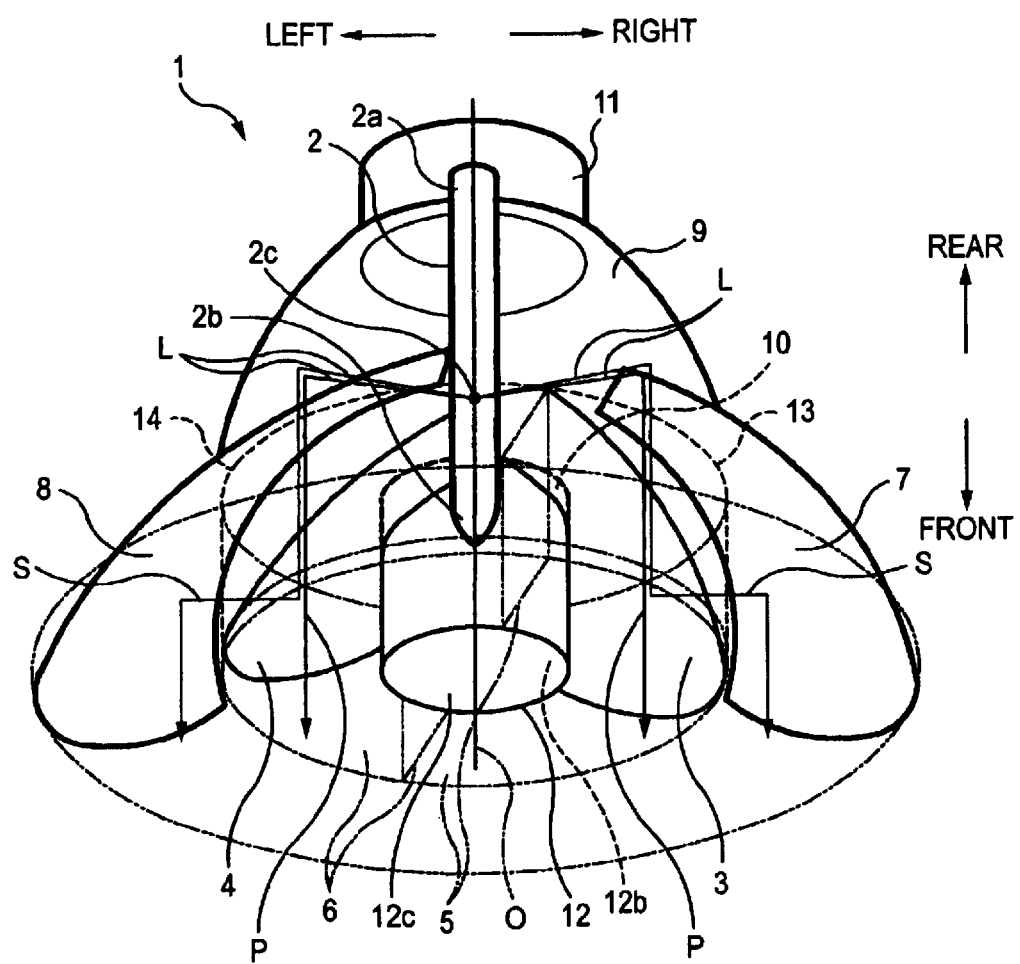
FIG. 3 is a perspective view illustrating exemplarily the construction of a light emitting apparatus according to a first embodiment of the invention.
Figure 4:
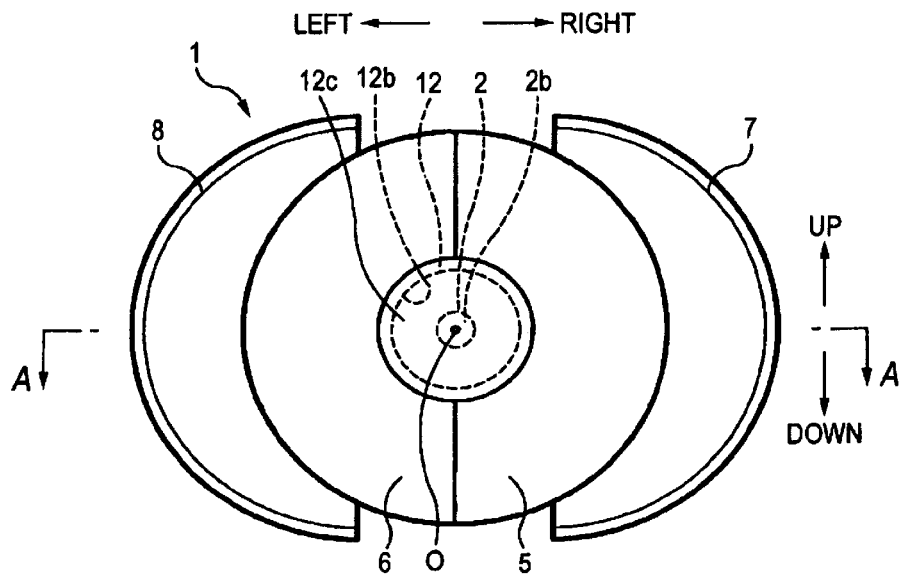
FIG. 4 is a front view of the light emitting apparatus shown in FIG. 3.
Figure 5:
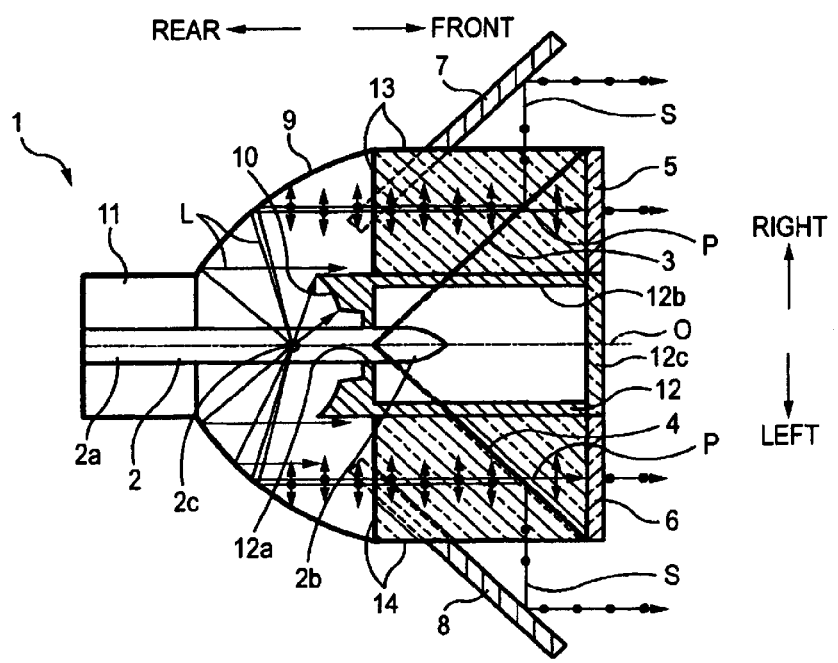
FIG. 5 is a cross-sectional view taken along the line A—A in FIG. 4.

FIG. 3 is a perspective view illustrating exemplarily the construction of the light emitting apparatus according to the first embodiment of the invention. In addition, FIG. 4 is a front view of the light emitting apparatus shown in FIG. 3. Additionally, FIG. 5 is a cross-sectional view taken along the line A—A in FIG. 4.

A light emitting apparatus 1 shown in FIG. 3 is an apparatus in which non-polarized light L emitted from a light source 2 is split to p polarized light P and s polarized light S by first and second polarized light splitters 13, 14, of the polarized light so split, the s polarized light S being referred to as first vertical polarized light, and the p polarized light P so split is then converted to second vertical polarized light by first and second ½ wave plates 5, 6 so as to emit the first and second vertical polarized light.

The light emitting apparatus 1 includes the light source 2 for emitting non-polarized light L, a parabolic mirror 9 for aligning non-polarized light L emitted from the light source 2 in a frontal direction so as to make the light so aligned into parallel light, first and second polarized light beam splitters 13, 14 divided to be arranged around the periphery of the light source 2 for splitting the non-polarized light L from the parabolic mirror 9 top polarized light P (horizontal polarized light) and s polarized light S, transmitting the p polarized light P (horizontal polarized light) in the same direction as that of the non-polarized light L, and reflecting the s polarized light S, first and second reflecting mirrors 7, 8 placed on outer circumferential portions of the first and second polarized light splitters 13, 14 for reflecting one of the s polarized light S and the p polarized light P which are so split by the polarized light beam splitter 13, 14 so as to be emitted as first vertical polarized light having a vibrating plane in an electric field which is substantially normal to the ground, and first and second ½ wave plate 5, 6 for converting the other of the p polarized light P and the s polarized light S as second vertical polarized light having a vibration plane in an electric field which is substantially normal relative to the ground.

Note that the "first and second polarized light beam splitters 13, 14" corresponds to the "first and second polarized light splitting section" stated in the claim. In addition, the "first and second ½ wave plates 5, 6" correspond to the "polarized light converting section" stated in the claim, and the "first and second reflecting mirrors 7, 8" correspond to the "first and second reflecting section" stated in the claim.

Referring to FIGS. 3 to 5, respective portions of the light emitting apparatus will be described in detail.

The light emitting apparatus 1 is an apparatus for securing the vision by clearly illuminating an area ahead of the vehicle by suppressing mainly a reflection which diffuses in a vertical direction which interrupts the vision of the driver which is a irregular reflection of light emitted from the headlamps resulting from fine particles of vapor or rain drops.

As shown in FIGS. 3 and 5, the light source 2 is made up of a lamp emitting a non-polarized light L such as a HID (High Intensity Discharge) light and is placed on a central optical axis O of the light emitting apparatus 1. A proximal end portion 2a of the light source 2 connects to a terminal portion 11 disposed at a rear portion of a lamp housing (not shown) and a distal end 2b thereof passes through a through hole 12a in a shade 12 so as to be disposed within a cylindrical portion 12b.

As shown in FIG. 5, a light emitting point 2c of the light source 2 is disposed between a parabolic mirror 9 and a spherical mirror 10. The light source 2 is a lamp which emits natural light of the non-polarized light L about the light emitting point 2c. Most of the non-polarized light L emitted from the light source 2 illuminates the spherical mirror 10 and the parabolic mirror 9. The light source 2 is illuminated by turning on a lighting switch (not shown) for a combination switch (not shown) placed in the vicinity of the drive's seat.

In addition, the light source 2 is not limited to the HID light but may be other lamps such as a halogen headlamp and a Xenon lamp, and there is no limitation on types thereof.

The shade 12 is made up of a substantially tubular member which is formed of glass integrally with the through hole 12a, the cylindrical portion 12b and the spherical mirror 10 and is placed on an optical axis O. The through hole 12a is a bore which penetrates the distal end portion 2b of the light source 2. The cylindrical portion 12b is a light guide for introducing the light emitted from the distal end portion 2b of the light source 2 forward of the vehicle. For example, a lamp cover 12c or a lens (not shown) which is formed of a transparent body such as glass is provided on a front surface portion of the cylindrical portion 12b. The spherical mirror 10 for reflecting the non-polarized light L emitted from the light source 2 to the parabolic mirror 9 is provided on a parabolic mirror 9 side of the shade 12.

The spherical mirror 10 is such as to be provided in order to enhance the utilization efficiency of light from the light source 2 and is, for example, a concave mirror made up of a spherical surface having its center substantially at the light illuminating point 2c of the light source. The spherical mirror 10 is disposed on a parabolic mirror 9 side of the shade 12. The spherical mirror 10 is a mirror adapted to reflect the non-polarized light L emitted from the light source 2 towards the parabolic mirror 9. Non-polarized light L reflected from it is reflected further by the parabolic mirror 9 to thereby become parallel light rays parallel to the optical axis O.

The parabolic mirror 9 is a mirror placed around the periphery of the light emitting point 2c of the light source 2 in such a manner as to cover the light emitting point 2c. The parabolic mirror 9 is, for example, an aspherical mirror which is formed into a substantially bowl-like shape and is deposited with aluminum for reflecting spherical light emitted from the light emitting point 2c of the light source 2 radially in all directions of parallel light. Semi-cylindrical first and second polarized light beam splitters 13, 14 which are combined into a cylindrical shape are divided to be disposed in front of the parabolic mirror 9. The parabolic mirror 9 is a mirror for reflecting the non-polarized light L directly emitted from the light emitting point 2c of the light source 2 and the non-polarized light L reflected on the spherical mirror 10 towards the first and right polarized light beam splitters 13, 14 which are disposed towards the front on the left and right sides of the light emitting apparatus 1 and reflecting them to parallel light rays which are parallel to the optical axis.

The first and second polarized light beam splitters 13, 14 are semi-cylindrical half prisms whose inclined surfaces are provided with first and second film laminated layers 3, 4. The first and second polarized light beam splitters 13, 14 refract non-polarized light L that has entered so that the incident angle becomes an angle of polarization or Brewster's angle through the refractive index of the prisms, and when light enters the first and second film laminated layers 3, 4 in the first and second polarized light beam splitters 13, 14 at the Brewster's angle, p polarized light P is allowed to transmit, whereas s polarized light S is reflected. The first and second polarized light beam splitters 13, 14 are polarized light splitting elements for splitting the non-polarized light L reflected forward by the parabolic mirror 9 into p polarized light P whose vibrating direction in an electric field becomes parallel relative to the incidence plane and s polarized light S which is perpindicular to the incidence plane in an electric field.

The first and second polarized beam splitters 13, 14 are disposed left and right of an outer circumferential portion of the cylindrical portion 12b of the shade 12, and first and second ½ wave plates 5, 6 are placed on respective front surface portions thereof laterally horizontally relative to the optical axis O and at 90° relative to the optical axis O.

The first and second film laminated layers 3, 4 which are placed on the first and second polarized light beam splitters 13, 14 are disposed in such a manner as to be divided laterally horizontally between an outer circumferential side of the first and second polarized light beam splitters 13, 14 and the cylindrical portion 12b of the shade 12 and to be inclined relative to the optical axis O so as to reflect the non-polarized light outwardly.

Figure 6:
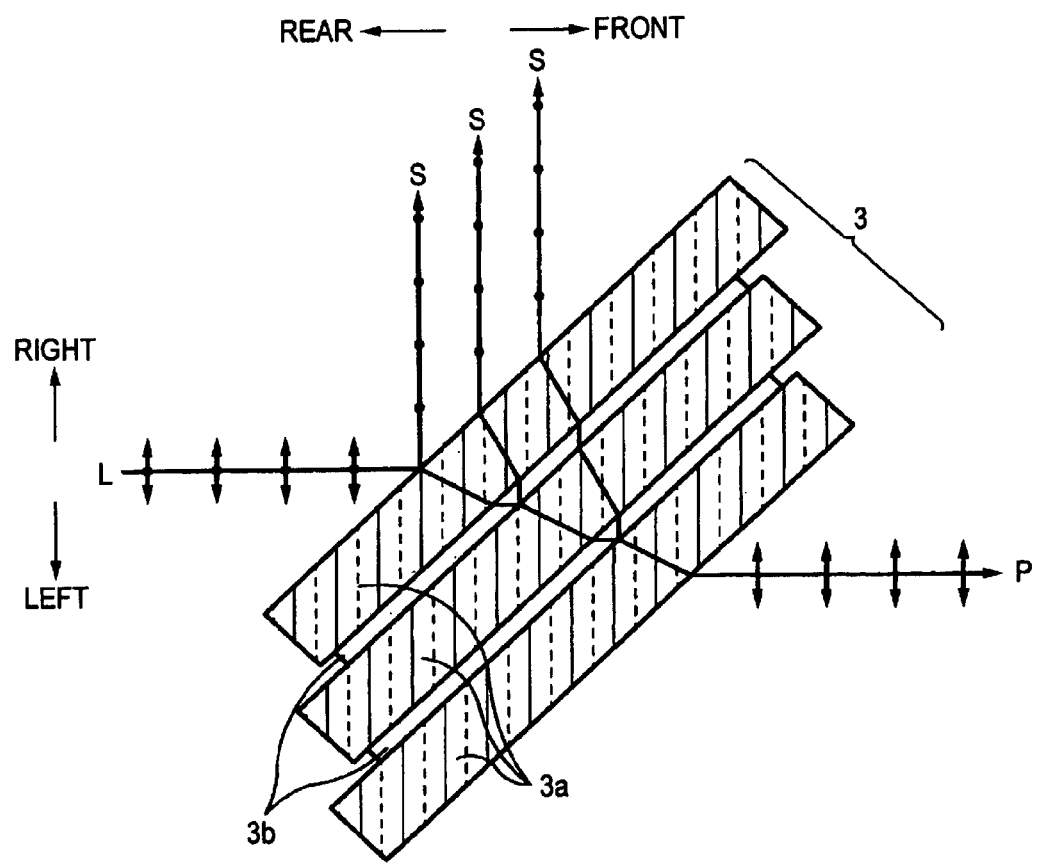
FIG. 6 is a diagram illustrating the light emitting apparatus according to the first embodiment of the invention, which is an exemplary diagram illustrating the construction of a first film laminated layer 3.

FIG. 6 illustrates the light emitting apparatus according to the first embodiment of the invention and is an exemplary diagram illustrating the construction of the first film laminated layer 3 placed on the first polarized light beam splitter.

Since the second film laminated layer 4 is constructed identically to the first film laminated layer 3 and is placed symmetrically, the first film laminated layer 3 will be described in detail by reference to FIG. 6.

The first film laminated layer 3 in the interior of the first polarized light beam splitter 13 is a laminated layer comprising, for example, a plurality of high refraction index films 3a each made up of resin or glass and, for example, low refraction index films 3b each made up of a gaseous layer such as air, and when non-polarized light L enters the first film laminated layer 3, the non-polarized light is split into p polarized light P and s polarized light S, and the p polarized light P is allowed to transmit, whereas the s polarized light S is reflected towards lateral directions where there exist the first and second reflecting mirrors 7, 8.

Here, as shown in FIG. 5, the p polarized light P is not reflected by the first and second polarized light beam splitters 13, 14 but transmits the first and second polarized light beam splitters 13, 14 so as to enter the first and second ½ wave plates 5, 6.

Then, the s polarized light S is reflected by the first and second polarized light beam splitters 13, 14 and changes its traveling direction so as to illuminate the first and second reflecting mirrors 7,, 8 which are disposed on the outer circumferential portions of the first and second polarized light beam splitters 13, 14.

In the first embodiment, since the first and second polarized light beam splitters 13, 14 which are the first polarized light splitting section are disposed laterally horizontally relative to the optical axis O so that the incidence plane of non-polarized light emitted from the light source is formed in the horizontal direction, there is established relationships; p polarized light P=horizontal polarized light, s polarized light S=vertical polarized light.

As shown in FIG. 5, the first and second reflecting mirrors 7, 8 are made up of two left and right plane mirrors which are disposed on the outer circumferential portions of the first and second film laminated layers 3, 4 substantially in parallel in such a manner as to incline forward at a predetermined angle relative to the optical axis O so that the direction of the s polarized light S is directed to the same direction as that of the p polarized light P so as to illuminate the front of the vehicle. The first and second reflecting mirrors 7, 8 are disposed around the periphery of the semi-cylindrical first and second polarized light beam splitters 13, 14 and are formed into a substantially crescent-like shape (refer to FIG. 4). The first and second reflecting mirrors 7, 8 reflect the s polarized light S which is reflected to outer circumferential directions by the first and second film laminated layers 3, 4 in the same direction as that of the p polarized light P and allow the light to pass to the outer circumferential portions of the first and second wave plate 5, 6 to thereby illuminate the front of the vehicle at the first vertical polarized light.

The first and second ½ wave plates 5, 6 are each made up of, for example, a plate-like body including two liquid-crystal-transparent-resin formed ¼λ wave plates which are overlapped each other. The first and second ½ wave plates 5, 6 are such as to utilize an interference linear effect resulting from the different refraction indices of the horizontal polarized light and the vertical polarized light and have a function to shift the vibrating direction of the p polarized light P (incident light) through 90° by phase shifting the optical axis of the vertical polarized light. The first and second ½ wave plates 5, 6 are placed in front of the first and second polarized light beam splitters 13, 14, respectively, so as to function as a converting section for converting p polarized light P that has passed through the first and second polarized light beam splitters 13, 14 so as to have a vibration plane in an electric field which is perpendicular to the ground. Polarized light that has passed through the first and second ½ wave plates 5, 6 illuminates the front of the vehicle as the second vertical polarized light.

As shown in FIG. 4, the first and second ½ wave plates 5, 6 include laterally symmetrical substantially semi-circular disc-like bodies which are disposed around the periphery of a front end portion of the shade 12.

In addition, while the first and second ½ wave plates 5, 6 are placed in such a manner as to be affixed to the front surfaces of the first and second polarized light beam splitters 13, 14 which are combined together into the cylindrical shape, the first and second ½ wave plates 5, 6 may be spaced apart from the front surfaces of the first and second polarized beam splitters 13, 14.

In addition, a lamp cover or lens which is made up of a transparent body may be appropriately placed on the front surface of the light emitting apparatus 1.

According to the light emitting apparatus that is constructed as is described heretofore, the following operation is performed.

When the lighting switch (not shown) is turned on, the light source 2 (refer to FIG. 5) is illuminated.

As shown in FIG. 5, most of non-polarized light L emitted from the light source 2 is reflected by the spherical mirror 10 so as to illuminate the parabolic mirror 9 or illuminates directly the parabolic mirror 9, whereas part of the non-polarized light L which comes out of the distal end portion 2b of the light source 2 transmits to the lamp cover 12c to thereby illuminate the front of the vehicle. The non-polarized light L that has illuminated the parabolic mirror 9 is then reflected in parallel in the forward direction so as to illuminate the first and second polarized light beam splitters 13, 14.

When entering the first and second polarized light beam splitters 13, 14, this non-polarized light L is refracted by the refraction indices of the prisms so that the incident angle becomes the Brewster's angle. Then, when light enters the first and second film laminated layers 3, 4 in the first and second polarized light beam splitters 13, 14 at the Brewster's angle, the non-polarized light L is split into p polarized light P and s polarized light S. The s polarized light S is reflected so as to illuminate the first and second reflecting mirrors 7, 8, whereas the p polarized light P is allowed to transmit so as to illuminate the first and second ½ wave plates 5, 6. Of the polarized light, the s polarized light S is reflected by the first and second reflecting mirrors 7, 8 in the same direction as the p polarized light P to thereby illuminate the front of the vehicle as the first vertical polarized light.

Furthermore, the p polarized light P that is split by the first and second polarized light beam splitters 13, 14 is converted to the second vertical polarized light by the first and second ½ wave plates 5, 6 to thereby emit vertical polarized light having a small reflectance relative to the vertical direction of the ground.

Since the light emitting apparatus 1 illuminates the front of the vehicle by the first and second vertical polarized light, the reflectance in the vertical direction relative to the ground of the first and second vertical polarized light is smaller than that of the horizontal polarized light, the degree to which the non-polarized light L is diffused in the vertical direction can be made smaller remarkably when compared with a case where non-polarized light L is illuminated. For example, even at the time of thick fog or heavy rain, it is possible to suppress the reflection which tends to be diffused in the vertical direction by particles of vapor and/or rain drops, whereby the occurrence of the wall of light can be suppressed by suppressing the diffusion of the reflected light, and hence there occurs no case where the far vision is interrupted, thereby making it possible to secure a far vision properly.

Figure 7A:
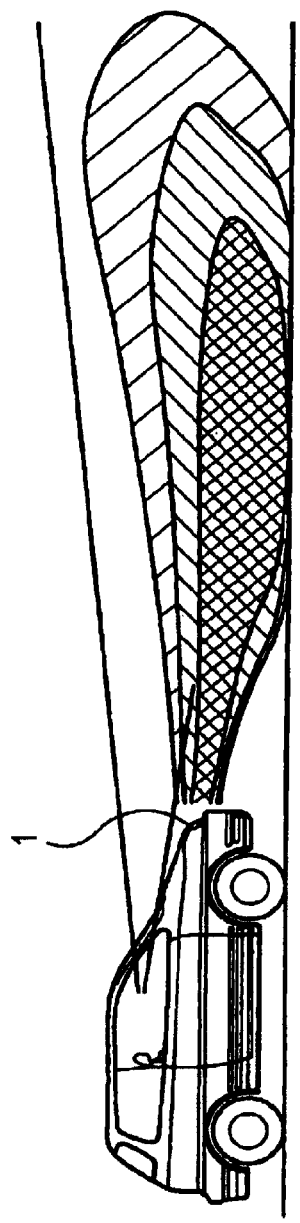
Figure 7B:
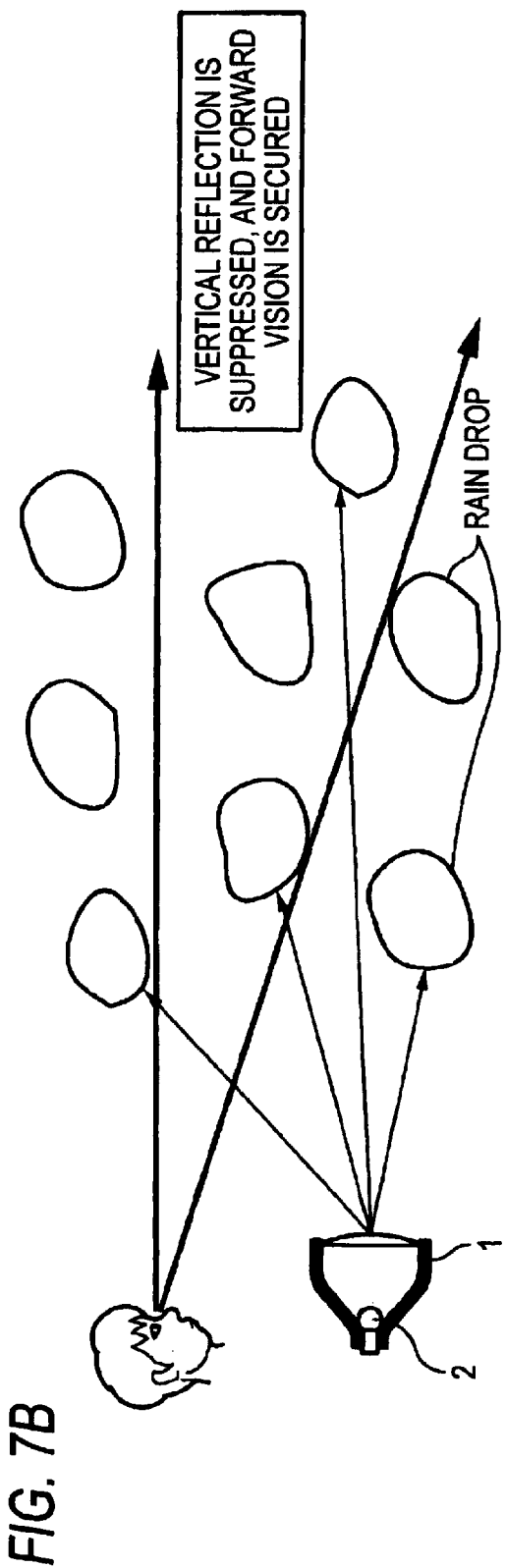

FIG. 7 illustrates an example where the light emitting apparatus 1 is applied to a headlamp of the vehicle, in which FIG. 7A is an exemplary diagram illustrating a distribution of light emitted from the light emitting apparatus 1 at the time of thick fog or heavy rain, and FIG. 7B is an exemplary diagram illustrating a irregular reflection produced on the surfaces of rain drops when light is emitted from the light emitting apparatus.

As shown in 7A, the light emitting apparatus 1 is, for example, a headlamp of the vehicle and is provided left and right at a front end portion of a vehicle body. When the vision is interrupted by thick fog or heavy rain, even if vertical polarized light emitted from the light emitting apparatus 1 enters fine particles of vapor or rain drops, a ratio at which the vertical polarized light that has so entered is diffused and reflected in the vertical is reduced remarkably when compared with a conventional headlamp which emits non-polarized light. Due to this, there is no case where a wall of light appears in front of the vehicle, whereby the vision in front of the driver can be secured, thereby making it possible to obtain a distant vision.

In addition, as shown in FIG. 7B, since the reflection produced on the surfaces of rain drops which diffuses in the vertical direction is suppressed to a small degree due to the light emitting apparatus 1 emitting vertical polarized light, the driver can secure the front vision without being interrupted by the wall of light.

In addition, in the event that the driver drives the vehicle in the rain at night, since light from other vehicles which is reflected on the surface of water present in the surface of the road enters the vision, the road surface looks like glittering, causing a very difficult driving condition.

However, with the light emitting apparatus according to the first embodiment of the invention, even at rainy night, since the reflection of emitted light on the road surface is suppressed, the dazzle to which the driver of an oncoming vehicle would be subjected due to light emitted from the light emitting apparatus 1 being reflected on the road surface can be reduced. Due to this, the forward visibilities of the driver of the subject vehicle and of the driver of the oncoming vehicle can be improved so as to allow them to drive their vehicles in more comfortable conditions.

Furthermore, with the light emitting apparatus of the first embodiment of the invention, the p polarized light P that is split by the first and second polarized light beam splitters 13, 14 is converted to the second vertical polarized light so as to be emitted, whereby light emitted from the light source 2 can be emitted forward with good efficiency without interrupting the light so emitted from the light source 2. Due to this, the interruption of the vision in front of the vehicle can be eliminated, thereby making it possible to provide bright and clear illumination. In addition, since the light emitting apparatus 1 is formed into the substantially circular shape on the whole, the headlamp can be designed to an optimal design.

(Second Embodiment)

Next, based on FIGS. 8 to 13, a light emitting apparatus according to a second embodiment of the invention will be described below.

Note that in the description of the second embodiment, like reference numerals are given to like constituent elements to those described in the first embodiment, and the repeated description thereof will be omitted.

Figure 8:
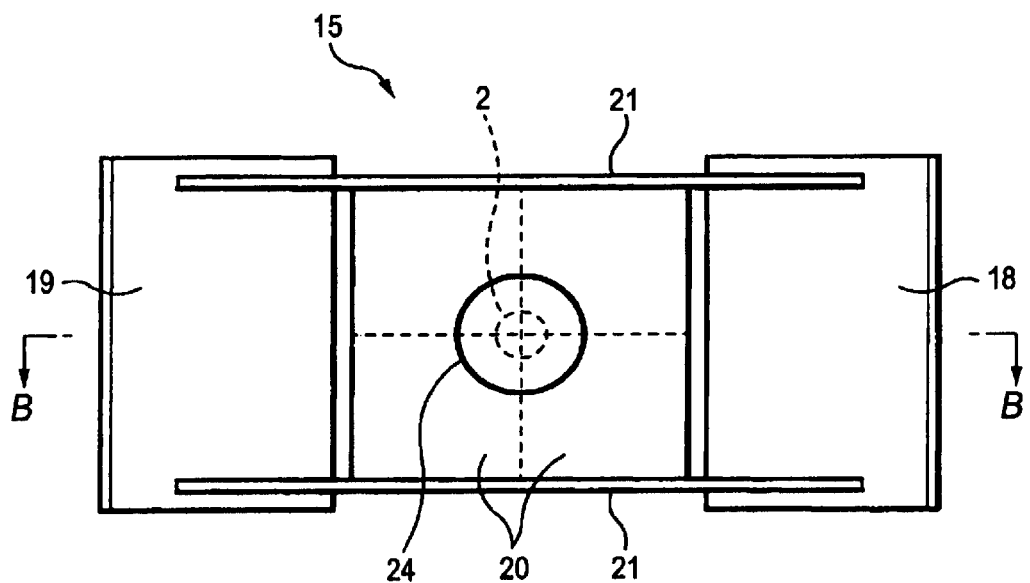
FIG. 8 is a schematic front view illustrating a light emitting apparatus according to a second embodiment of the invention.
Figure 9:
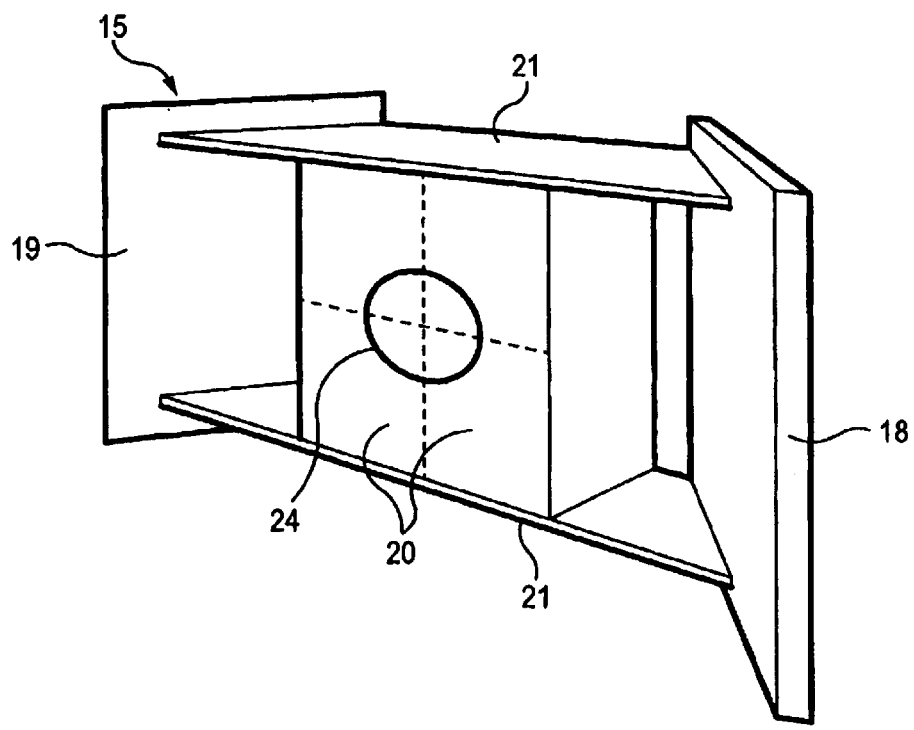
FIG. 9 is a schematic perspective view illustrating the light emitting apparatus according to the second embodiment of the invention.
Figure 10:
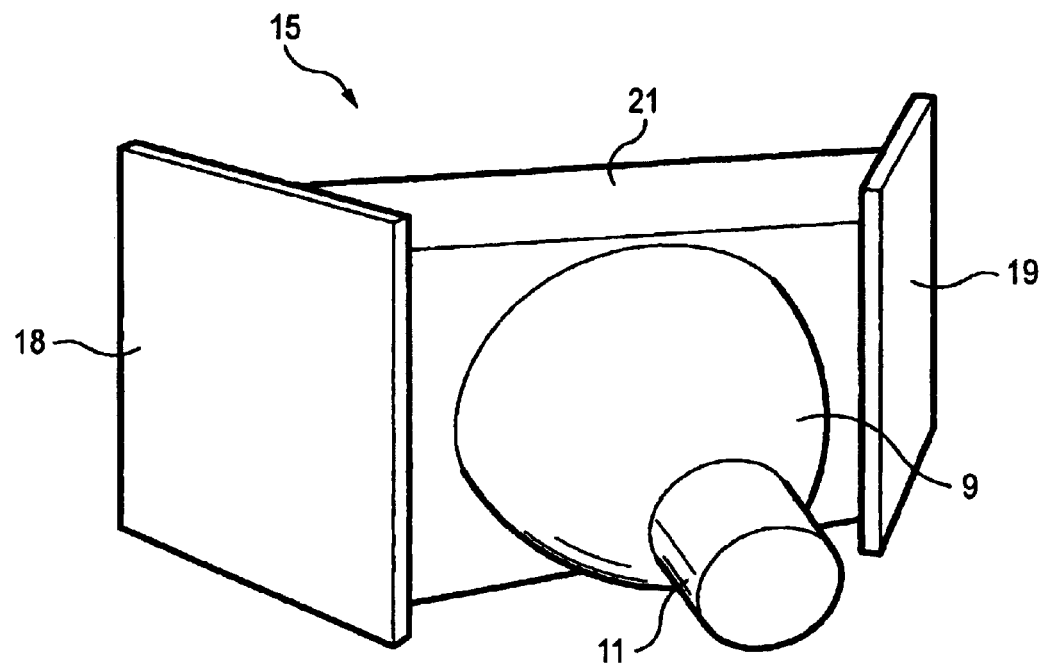
FIG. 10 is a schematic perspective view illustrating the light emitting apparatus according to the second embodiment of the invention.

FIG. 8 is a schematic front view illustrating the light emitting apparatus according to the second embodiment of the invention. FIG. 9 is a schematic perspective view illustrating the light emitting apparatus according to the second embodiment of the invention. FIG. 10 is another schematic perspective view illustrating the light emitting apparatus according to the second embodiment of the invention.

As shown in FIGS. 8 to 10, the light emitting apparatus 15 according to the second embodiment is such that the substantially circular light emitting apparatus 1 is changed so as to be formed as a rectangular type.

Figure 11:
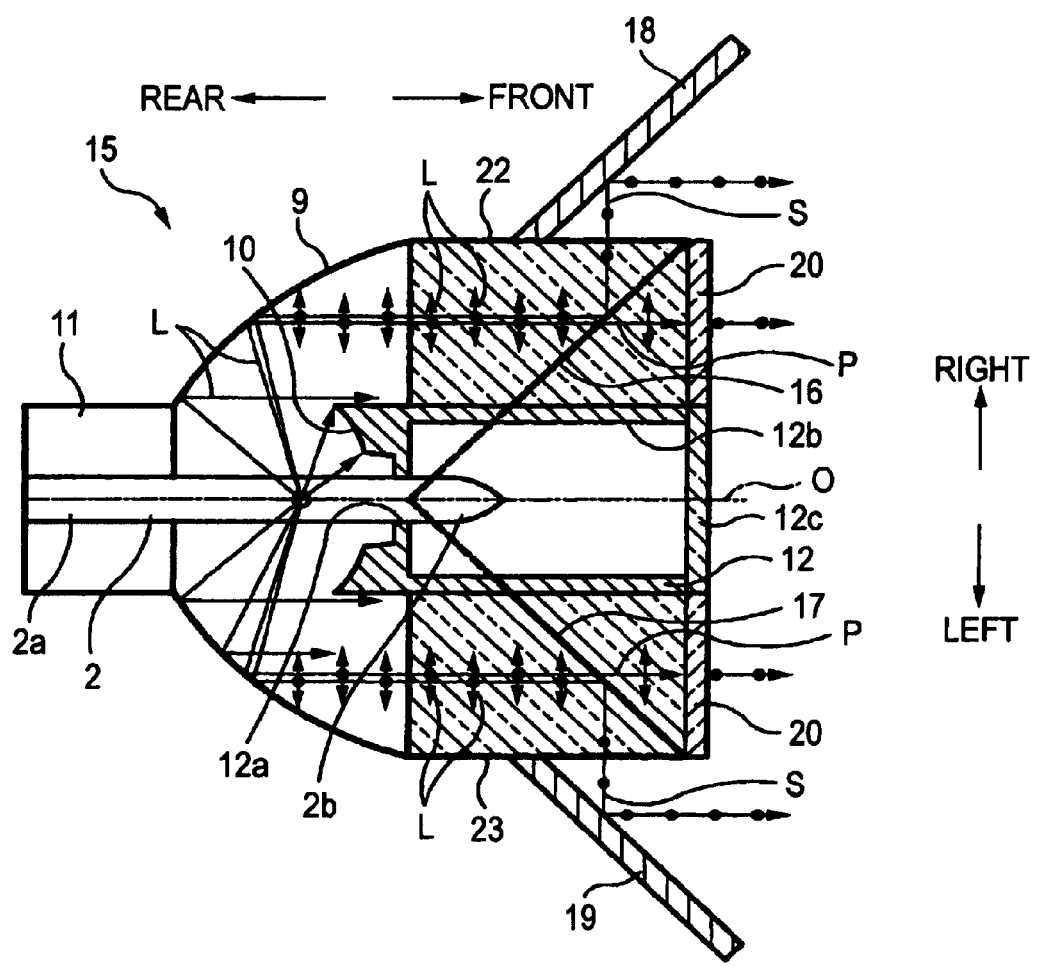
FIG. 11 is a schematic cross-sectional view of the second embodiment of the invention, which is the cross-section when viewed from the line B—B in FIG. 8.

FIG. 11 is a schematic cross-sectional view illustrating the second embodiment of the invention, which results when viewed from the B—B line in FIG. 8.

As shown in FIG. 11, the light emitting apparatus 15 includes a light source 2, a parabolic mirror 9 for aligning the emitting angle of non-polarized light L emitted from the light source 2 to a forward direction so as to make the non-polarized light L into parallel light rays, a spherical mirror 10 for reflecting the non-polarized light L emitted from the light source 2 to the parabolic mirror 9, first and second polarized light beam splitters 22, 23 for splitting the non-polarized light L from the parabolic mirror 9 into p polarized light (horizontal polarized light) P and s polarized light (first vertical polarized light) S, first and second reflecting mirrors 18, 19 for reflecting the s polarized light (the first polarized light) S that is split by the first and second polarized light beam splitters 22, 23, a ½ wave plate 20 for converting the p polarized light (the vertical polarized light) P that has passed through the first and second polarized light beam splitters 22, 23 into second vertical polarized light, and a housing 21 (refer to FIGS. 8 to 10).

The first and second polarized light beam splitters 22, 23 are divided substantially horizontally for disposition in such a manner that an incidence plane of non-polarized light L emitted from the light source 2 is formed so as to extend horizontally. The p polarized light P that is split by first and second film laminated layers 16, 17 provided on the first and second polarized light beam splitters 22, 23 is allowed to transmit in the same direction as that of the non-polarized light L and is thereafter converted to second vertical polarized light by the ½ wave plate 20. The s polarized light S that is split by the first and second polarized light beam splitters 22, 23 is reflected horizontally and is thereafter emitted as first vertical polarized light that is to be emitted in the same direction as that of the p polarized light P by the first and second reflecting mirrors 18, 19.

Note that the "first polarized light beam splitter 22" corresponds to the "first polarized light splitting section" stated in the claim. In addition, the "second polarized light beam splitter 23" corresponds to the "second polarized light splitting section" stated in the claim, the "½ wave plate 20" to the "converting section", and the "first and second reflecting mirrors 18, 19" to the "reflecting section".

Referring to FIGS. 8 to 13, the respective portions of the light emitting apparatus 15 will be described in detail.

The light emitting apparatus 15 shown in FIGS. 8 to 13 is, for example, a fog lamp of the vehicle and is provided left and right at the front end portion of a vehicle body (not shown). The light source 2 is illuminated to illuminate the front of the vehicle when turned on by a fog lamp switch (not shown) positioned in the vicinity of the driver's seat or on the instrument panel.

As shown in FIG. 11, a shade 12 is disposed at a central portion on a front surface of the parabolic mirror 9 for reflecting non-polarized light L from the light source 2 in parallel to an optical axis O, and the first and second polarized light beam splitters 22, 23 are disposed around the periphery of the shade 12 left and right in the horizontal direction.

The first and second polarized light beam splitters 22, 23 include angled tubular prisms positioned left and right on outer circumferential portions of a cylindrical portion 12b of the shade 12, and first and second film laminated layers 16, 17 are disposed on inclined surfaces of the prisms through coating.

FIG. 12 illustrates the light emitting apparatus according to the second embodiment, which is a schematic perspective view illustrating the first polarized light beam splitter.

As shown in FIG. 12, the angled tubular first polarized light beam splitter 22 is made up of an angled tubular body of glass in which a semi-cylindrical notched portion 22c for supporting the shade 12 from the right-hand side is formed along the optical axis O and incorporates therein the first film laminated layer 16. As with the embodiment, the first polarized light beam splitter 22 is provided by overlapping, for example, vertically symmetrical tubular joint portions 22a, 22b.

FIG. 13 illustrates the light emitting apparatus according to the second embodiment of the invention, which is a schematic perspective view of the second polarized light beam splitter.

As shown in FIG. 13, the second polarized light beam splitter 23 is an angled tubular body of glass which is formed into a symmetrical shape with the first polarized light beam splitter 22. The second polarized light beam splitter 23 has a semi-cylindrical notched portion 23c for supporting the shade 12 from the left-hand side formed along the optical axis O and incorporates therein the second film laminated layer 17. As with the embodiment, the second polarized light beam splitter 23 is provided by overlapping, for example, vertically symmetrical joint portions 23a, 23b.

When the second polarized light beam splitter 23 and the first polarized light beam splitter 22 (refer to FIG. 12) are combined together, the notched portion 22c (refer to FIG. 12) and the notched portion 23c form a cylindrical bore, so that the shade 12 is placed in the bore.

In addition, the first polarized light beam splitter provided by vertically overlapping the two tubular joint portion 22a and tubular joint portion 22b which are shown in FIG. 12 and the second polarized light beam splitter 23 provided by vertically overlapping the two tubular joint portion 23a and tubular portion 23b which are shown in FIG. 13 may be formed into a single body so as to eliminate the overlapping.

The first and second polarized light beam splitters 22, 23 in the second embodiment are such that those formed from the same material as that of the first and second polarized light beam splitters 13, 14 (refer to FIG. 3) in the first embodiment are changed in shape into an angled tubular shape and are suspended on the left and right sides.

As shown in FIG. 11, the first and second film laminated layers 16, 17 of the first and second polarized light beam splitters 22, 23 allow the p polarized light P to transmit to enter the ½ wave plate 20, and reflects the s polarized light S to change its traveling direction so as to illuminate the first and second reflecting mirrors 18, 19.

As shown in FIGS. 8 and 9, the first and second reflecting mirrors 18, 19 in the second embodiment is such that those formed from the same material as that of the first and second reflecting mirrors 7, 8 (refer to FIG. 3) in the first embodiment are changed in shape into an angled tubular shape. The first and second reflecting mirrors 18, 19 are held by the housing 21 interposed therebetween.

As shown in FIG. 11, the first and second reflecting mirrors 18, 19 include two left and right rectangular plane mirrors which are positioned in such a manner as to incline at a predetermined angle so that the s polarized light S illuminates in the same direction as the p polarized light P. The first and second reflecting mirrors 18, 19 reflect the s polarized light S which is reflected in an outer circumferential direction by the first and second polarized light beam splitters 22, 23 and allow the reflected light to transmit so as to illuminate the front of the vehicle as the first vertical polarized light.

In the second embodiment, since the first and second polarized light beam splitters 22, 23 which are the first polarized light splitting section are disposed in such a manner that the incidence plane of the non-polarized light L emitted from the light source 23 is formed horizontally, the following relationships are established; p polarized light P=vertical polarized light, s polarized light S=vertical polarized light.

The p polarized light P that has entered the ½ wave plate 20 is converted to polarized light having a vibrating plane in an electric field which is substantially perpendicular to the ground and illuminates the front of the vehicle as the second vertical polarized light.

As shown in FIG. 9, the ½ wave plate 20 in the second embodiment is such as to be formed into a single plate from the same material as that of the first and second polarized light beam splitters 5, 6 (refer to FIG. 4), the single plate being then changed in shape to a rectangular shape. For example, a disc-like transparent plate 24 formed of a transparent resin or glass which is placed around the periphery of the front end portion of the shade 12 is placed inside the ½ wave plate 20.

As shown in FIG. 11, the ½ wave plate 20 is the converting section placed in front of the first and second polarized light beam splitters 22, 23 for changing the vibrating direction of the p polarized light P that has passed through the first and second film laminated layers 16, 17 so that the polarized light vibrates vertically relative to the ground.

Note that while the ½ wave plate 20 is placed in such a manner as to be affixed to the front surfaces of the first and second polarized light beam splitters 22, 23, the ½ wave plate 20 may be disposed in such a manner as to be spaced apart from the front surface of the first and second polarized light beam splitters 22, 23.

In addition, a lamp cover or lens which is made up of a transparent body may be appropriately placed on the front surface of the light emitting apparatus 15.

According to the light emitting apparatus according to the second embodiment that is constructed as is described heretofore, the following operation is performed.

When the fog lamp switch (not shown) is turned on, the light source (refer to FIG. 11) is illuminated.

As shown in FIG. 11, non-polarized light L emitted from the light source is reflected on the spherical mirror 10 so as to illuminate the parabolic mirror 9, or illuminates the parabolic mirror 9 directly, whereas part of the non-polarized light L emitted from the distal end portion 2b of the light source 2 transmits the lamp cover 12c so as to illuminate forward. The polarized light L that has illuminated the parabolic mirror 9 is reflected forward in parallel to the optical axis O so as to illuminate the first and second polarized light beam splitters 22, 23.

When entering the first and second polarized light beam splitters 22, 23, this non-polarized light L refracts so that the incident angle becomes the Brewster's angle by refractive indices of the prisms, and when the non-polarized light L enters the first and second film laminated layers 16, 17 in the first and second polarized light beam splitters 22, 23 at the Brewster's angle, the light is split to p polarized light P and s polarized light S. The s polarized light S is reflected so as to illuminate the first and second reflecting mirrors 18, 19, whereas the p polarized light P travels straight to illuminate the ½ wave plate 20. Of the polarized light, the s polarized light S is reflected by the first and second reflecting mirrors 18, 19 to thereby become parallel to the optical axis O, illuminating forward as the first vertical polarized light.

Furthermore, the p polarized light P that is split by the first and second film laminated layers 16, 17 is converted to the second vertical polarized light by the ½ wave plate 20 to thereby emit vertical polarized light having a small reflectance in the vertical direction to the ground.

Since the light emitting apparatus 15 illuminates forward with the first and second polarized light, the reflectance of light that diffuses in the vertical direction relative to the ground due to the first and second vertical polarized light is smaller than the illumination with the horizontal polarized light. Due to this, when compared with the conventional light emitting apparatus which emits non-polarized light L, the light emitting apparatus 15 can reduce remarkably the amount of the reflection light that diffuses in the vertical direction.

Consequently, even at the time of, for example, thick fog or heavy rain, reflection light that diffuses in the vertical direction due to fine particles of vapor or rain drops can be suppressed, thereby making it possible to secure more vision in front than when secured conventionally. In addition, by being formed into the rectangular shape, the light emitting apparatus 15 can be configured to provide a simple construction and a high performance, whereby the light emitting apparatus 15 can be preferably applied to fog lamps.

Note that the invention is not limited to the first and second embodiments and may be altered and modified variously without departing from the scope of the technical concept of the invention, and it goes without saying that the invention covers the alterations and modifications to the invention.

For example, the light emitting apparatuses 1, 15 can similarly be used as a lamp which emits vertical polarized light by inclining the whole of the light emitting apparatuses 1,15 through 90° and providing the converting section in front of the reflecting section instead of being provided on the front surface of the polarized light beam splitter.

Note that the light emitting apparatuses 1, 15 may be not only the headlamps and fog lamps of the vehicle but also rear fog lamps, stop lamps and side marker lamps thereof.

In addition, the light emitting apparatuses 1, 15 may be a headlamp of a motorcycle or a headlamp of a marine boat.

(Other Embodiment)

The light emitting apparatus 1 is a lamp for illuminating ahead of the vehicle by light emitted from the light source 2 and is provided left and right at a front end portion of the vehicle (not shown).

FIG. 15 is a diagram illustrating the polarized light splitting device and the automotive light emitting apparatus according to the embodiment of the invention and is an exemplary diagram illustrating the construction of the first film-laminated layer provided on the first polarized light beam splitter.

The second film-laminated layer 40, which is identical in construction to the first film-laminated layer 30, is placed laterally symmetrical with the first film-laminated layer 30, and hence one of the laterally symmetrically placed film-laminated layers which is the first film-laminated layer 30 will be described in detail by reference to FIG. 15.

As shown in FIG. 15, the first film-laminated layer 30 in the interior of the first polarized light beam splitter 13 is a laminated layer including a plurality of high refractive index films 30a each formed of transparent resin or glass and having a uniform thickness, low refractive index layers 30b each formed of, for example, a gaseous layer and having a uniform thickness and spacers 30d for maintaining the distance between the laminated high refractive index films 30a, 30a at a parallel and constant interval, and when non-polarized light L enter the first film-laminated layer 30, the first film-laminated layer 30 splits the non-polarized light L that has so entered into p polarized light P and s polarized light S, and allows the p polarized light to transmit while reflecting the s polarized light S laterally to directions where the first and second reflecting mirrors 7, 8 exist.

The low refractive index layer 30b made up of the transparent gaseous layer and the spacers 30d for retaining the shape of the low refractive index layer 30b are placed between the respective high refractive index films 30a. While a gas in the gaseous layer is air in this embodiment, a rare gas other than air such as helium and argon can be used.

The spacer 30d is a pillar-like transparent body formed of glass or resin and is interposed between the respective high refractive index films 30a. Since the spacer 30d is affected by heat generated from the light source 2, the spacer 30d is formed from a heat resistant resin having a low thermal expansion. Note that the spacer 30d may be a non-transparent body.

Thus, by forming the low refractive index layer 30b of the gaseous layer including air and retaining the spacers 30d, the number of man-hours for working and the production costs can be reduced.

In addition, even in the event that the first film-laminated layer 30 is subjected to vibrations or impacts while the vehicle is running, the spacers 30d permit partially the relative displacement of the first film-laminated layer 30 and maintain the space between the respective high refractive index layers 30a and the space between the low refractive index films 30b, whereby the vibration resistance and impact resistance can be improved. Due to this, the first polarized light beam splitter 13 can be made to be optimum as a polarized light splitting device equipped on vehicles.

FIG. 17 illustrates the polarized light splitting device and the automotive light emitting apparatus according to the embodiment of the invention and is a perspective view illustrating a modification to the spacer.

In addition, as shown in FIG. 17, in order to improve the retaining force for maintaining the space between the high refractive index films 30a and the space between the respective low refractive index layer 30b, the spacer 30d may be such that spacers 30e each formed of a small pillar-like transparent body are interspersed so as to support the laminated layer. Thus, by interspersing the spacers 30e that are constructed simply between the respective high refractive index films 30a, the space between the high refractive index film 30a and the low refractive index film 30b is retained so that the deformation of the first polarized light beam splitter 13 including the film-laminated layer 30 can be prevented, whereby the space between the respective high refractive index films 30a can be retained firmly, thereby making it possible to improve the vibration resistance and impact resistance.

Note that as a means for forming the spacers 30e in such a manner as to intersperse, fog-like transparent adhesives each having a particulate diameter which is slightly larger than a desired thickness of the gaseous layer (for example, 200 μm) are sprayed to the high refractive index film 30a so as to form the spacers 30e. Since the spacers 30e can be formed easily as is described above, the productivity can be improved.

FIG. 18 illustrates the polarized light splitting device and the automotive light emitting apparatus according to the embodiment of the invention and is a perspective view illustrating another modification to the spacer.

In addition, as shown in FIG. 18, spacers 30f may be such that transparent bodies each made up of an elongated plate are formed into a grid-like structure. By forming the spacers 30f into the grid-like structure, the strength of the spacers 30f can be improved further, whereby the high refractive index films 30a and the low refractive index films 30b can be retained firmly.

In addition, in the first film-laminated layer 30, by forming the spacers 30f into the grid-like structure, the spacers 30f and the high refractive film 30a can be formed integrally at one time, whereby the productivity can be improved. In addition, the first film-laminated layer 30 can be produced by disposing the spacers 30f in such a manner as to be held between the respective high refractive index films 30a, whereby the desired first film-laminated layer 30 can easily be produced. Note that the spacers 30f may be formed into a circular or polygonal mesh-like structure.

FIG. 16 is a graph of broken line showing a relationship between the number of times of Brewster reflections and a split ratio of s polarized light of the first and second polarized light beam splitters.

A split ratio of s polarized light at the first film-laminated layer 30 of the first polarized light beam splitter 13 shown in FIG. 15 in which the non-polarized light L is split into the p polarized light P and the s polarized light S and the s polarized light S is reflected increases, as shown in FIG. 16, as the number of times of Brewster reflections (the number of laminated high refractive index films 30a) increases.

When it enters the first polarized light beam splitter 13, the angle of incidence of the non-polarized light L into the first film-laminated layer 30 becomes the Brewster angle θ due to the refractive index of the prism.

As shown in FIG. 15, in the event that the angle of incidence of the non-polarized light L is the Brewster angle, substantially 100% of the constituent of the p polarized light P is allowed to transmit through the first film-laminated layer 30.

As shown in FIGS. 15 and 16, the s polarized light S of the non-polarized light L is split by about 15% at the high refractive index film 301 which is a first laminated layer. Furthermore, about 13% of the remaining s polarized light S is split at the high refractive index film 302 which is a second laminated layer. Furthermore, the remaining s polarized light S is split at the high refractive layer 303 which is a third laminated layer.

Thus, the first film-laminated layer 30 can improve the split ratio of s polarized light S substantially in proportion to an increase in the number of layers laminated.

It is preferred that the number of laminated layers of the first film-laminated layer 30 is five (polarized light split ratio is 55%) or more.

The second film-laminated layer 40 of the second polarized light beam splitter 14 is such that a film-laminated layer identical to the film-laminated layer 30 of the first polarized light beam splitter 13 is placed symmetrically with the film-laminated layer 30.

Here, as shown in FIG. 18, the p polarized light P is not reflected by the first and second polarized light beam splitters 13, 14 but is allowed to transmit the first and second polarized light beam splitters 13, 14 so as to enter the first and second ½ wave plates 5, 6.

Note that the invention is not limited to the embodiment and can be altered and modified in various ways without departing from the scope of the technical concept of the invention, and it goes without saying that the invention includes those alterations and modifications.

In addition, when used for rear fog lamps, side marker lamps, direction indicator lamps and stop lamps, the light emitting apparatus 15 can constitute such lamps which have the polarized light splitting device having good vibration and impact resistances and which can allow the drivers of other vehicles to see clearly the light emitted from the respective lamps at the time of thick fog or heavy rain.

Note that the light emitting apparatus 15 may be a light emitting apparatus of a two-wheeled vehicle such as a motorcycle or a marine boat such as a motor boat.

As is described heretofore, according to the light emitting apparatus according to the first aspect of the invention, the polarized light splitting section is divided to be disposed around the periphery of the light source, and the s polarized light which is reflected by each polarized light splitting section is aligned in the same emitting direction as that of the p polarized light which is allowed to transmit each polarized light splitting section, so that both the p polarized light and the s polarized light can be emitted as vertical polarized light so as to illuminate ahead of the vehicle. Due to this, all the non-polarized light emitted from the light source is converted to the vertical polarized light so as to attempt an effective use of the light to thereby suppress the reflection in the vertical direction, whereby an area ahead of the vehicle can be illuminated clearly, thereby making it possible to secure the vision in front of the vehicle. In addition, the light emitting apparatus can be made compact by dividing the polarized light splitting section to be disposed around the periphery of the light source.

According to the light emitting apparatus according to the second aspect of the invention, the first and second polarized light splitting section are divided in the substantially horizontal direction to be disposed so that an incidence plane of non-polarized light emitted from the light source is formed in such a manner as to extend horizontally, whereby the s polarized light that is split and reflected by the first and second polarized light splitting section has a vibration plane in an electric field which is substantially normal to the ground, the light being able to be used as first vertical polarized light as it is. Due to this, when compared with the s polarized light emitted via the reflecting section, by converting the vibration plane of the p polarized light directly reflected from the first and second polarized light splitting section by the converting section, the construction becomes simple in which the converting section is provided, thereby making it possible to make the light emitting apparatus compact further.

Further, as is described heretofore, according to the polarized light splitting device asset forth in the first aspect of the invention, since, even in the event that vibrations act on the polarized light splitting device, the relative deviation between the respective high refractive index films is permitted by the gaseous layer which is the low refractive index film at other positions where the spacer is provided, the performance of the polarized light splitting device can be secured for a long period of time. In addition, since a certain space is ensured between the high refractive index film and the low refractive index film, a deformation or deviation in position between the high refractive index film and the low refractive index film can be prevented.

According to the automotive light emitting apparatus as set forth in the second aspect of the invention, the spacer can maintain a constant space between the respective high refractive index films by the spacer. Due to this, even if the vehicle is subjected to vibrations or impacts while running, the spacer can maintain the distance between and shape of the respective high refractive index films, so that proper polarized light splitting can be implemented at all times, thereby making it possible to provide an optimal polarized light splitting device for an automotive light emitting apparatus. In addition, the production costs can be reduced by the formation of the low refractive index film of the gaseous layer. With the spacer being partially interposed between the respective high refractive index films, the prevention of interruption of passage of the p polarized light and the s polarized light through the high refractive index films, thereby making it possible to improve the utilization rate of light.

According to the polarized light splitting device and the automotive light emitting apparatus as set forth in the third aspect of the invention, by interspersing the spacer, not only can the function of the space be obtained through a simple construction but also the prevention of the passage of the p polarized light and the s polarized light between the respective high refractive index films can be suppressed to a minimum level. In addition, since the spacer can easily be placed between the respective high refractive index films by being interspersed between the respective high refractive index films, the productivity can be improved.

According to the polarized light splitting device and the automotive light emitting apparatus as set forth in the fourth aspect of the invention, the spacer that is simple in construction and sturdy can be obtained by forming the spacer into the grid-like or mesh-like structure. In addition, since the space can be placed in such a manner as to be held between the respective high refractive index films, a polarized light splitting device having a desired polarized light splitting function can easily be obtained, thereby making it possible to improve the productivity.

What is claimed is:

1. A light emitting apparatus comprising;
   a light source for emitting non-polarized light,
   a parabolic mirror for making non-polarized light emitted from the light-source into parallel light beams,
   first and second polarized light splitting sections divided to be arranged around the periphery of the light source for splitting the non-polarized light from the parabolic mirror into p polarized light and s polarized light, transmitting the p polarized light in the same direction as the direction of incidence of the non-polarized light and reflecting the s polarized light, the first and second polarized light splitting section being divided in a substantially horizontal direction to be disposed so that an incidence plane of non-polarized light emitted from the light source is formed in such a manner as to extend horizontally;
   a reflecting section disposed on outer circumferential portions of the first and second polarized light splitting sections for reflecting the s polarized light reflected by the first and second polarized light splitting sections in the same direction as the p polarized light, the s polarized light reflected by the polarized light splitting sections being reflected to the outer circumferential portions of the polarized light splitting sections, and
   a conversion section for converting by 90° an electric field vibration plane of said p polarized light,
   wherein p polarized light split by the first and second polarized light splitting sections is transmitted in the same direction as the non-polarized light and is thereafter converted to second vertical polarized light by the conversion section, and s polarized light split by the first and second polarized light splitting sections is emitted as first vertical polarized light which is reflected and is thereafter emitted in the same direction as the p polarized light by the reflecting section, and
   wherein one of the s polarized light and the p polarized light which are split by the first and second polarized light splitting sections is emitted as first vertical polarized light having a vibration plane in an electric field which is substantially normal to the ground, and the other of the p polarized light and the s polarized light is converted as second vertical polarized light having a vibration plane in an electric field which is substantially normal to the ground by said conversion section.

* * * * *